United States Patent [19]
Bro et al.

[11] 3,929,507
[45] Dec. 30, 1975

[54] MULTI CELL RESERVE BATTERY

[75] Inventors: Per Bro, Andover; Robert H. Kelsey, Acton; Nikola Marincic, Winchester, all of Mass.

[73] Assignee: P. R. Mallory & Co., Inc., Indianapolis, Ind.

[22] Filed: Aug. 22, 1973

[21] Appl. No.: 390,677

[52] U.S. Cl. .................................. 136/114; 136/90
[51] Int. Cl. ........................................... H01m 21/00
[58] Field of Search ........................ 136/112–114, 136/162, 90–92

[56] References Cited
UNITED STATES PATENTS

| | | | |
|---|---|---|---|
| 2,847,494 | 8/1958 | Jeannin | 136/90 |
| 3,484,297 | 12/1969 | Zaleski | 136/114 |
| 3,536,536 | 10/1970 | Lucas | 136/114 |
| 3,575,726 | 4/1971 | Marsault | 136/114 |
| 3,663,302 | 5/1972 | Kaye | 136/114 |
| 3,736,188 | 5/1973 | Kaye | 136/90 |
| 3,743,545 | 7/1973 | Merz et al | 136/114 |

*Primary Examiner*—Anthony Skapars
*Attorney, Agent, or Firm*—Ronald S. Cornell; Israel Nissenbaum; Charles W. Hoffmann

[57] ABSTRACT

A new mine battery having a smaller volume and a lower weight than current mine batteries, is based on a high energy density new lithium/sulphur dioxide system, utilizing a reserve structure for holding the corrosive electrolyte separate from the battery cell components until activation is desired, whereby storeability may be achieved in excess of 10 years. The battery consists of a plurality of cells; and is provided in two different modifications. One modification contains the electrolyte in a sealed internal reservoir container in each cell. The other modification contains a reserve sealed common reservoir container of the electrolyte, which may be activated when use of the battery is desired, by transferring the electrolyte from the reserve common reservoir to each of the cells for activation and immediate operation.

In each modification, each reserve container remains sealed until activation of the battery is desired. The container is then suitably opened to release the electrolyte to the related cell or cells.

3 Claims, 5 Drawing Figures

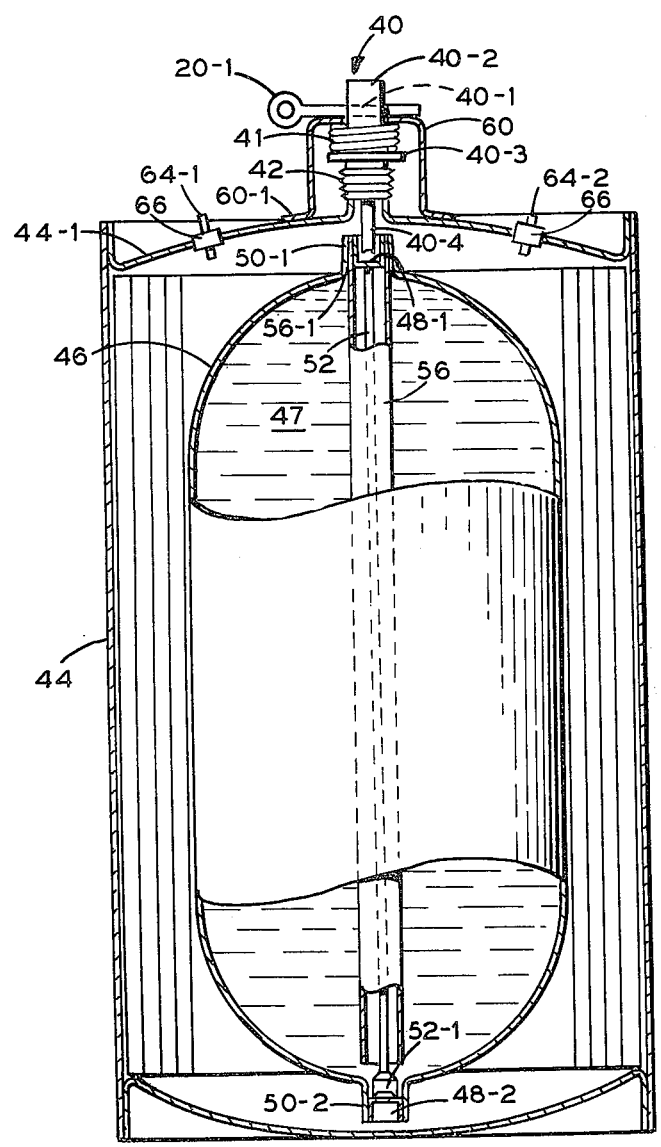

MULTI CELL RESERVE BATTERY

This invention relates to high energy density batteries, of a reserve type, capable of long shelf life before use, and suitable for extremely low temperature usage.

In many military applications, batteries are required which may be retained in inventory and storage for a long time before being called upon for use; and it is desirable that such batteries shall be kept in non-active condition during such storage, but be subject to simple and rapid activation when they are drawn from storage and placed into service. It is further desired that such batteries be effective in operation in environments that may be subjected to very low sub-zero temperatures.

Recent developments in new high energy density battery systems provide greater energy density than do conventional batteries, and it is therefore desirable to adapt such new high energy battery systems to many applications, both military and non-military, where the batteries are to be stored for long periods of non use, to be available, immediately, for use in emergency situations.

One object of this invention is to provide reserve type batteries utilizing such high density battery cells, so they will be available for applications where the battery may be kept in storage and held in reserve for relatively long periods of time before being called into service.

In certain such applications, it is desirable to be able to store the battery for a long period, up to 10 years, before the battery is called into service, and to be able to activate the battery for immediate service, when desired. For such purpose, it is desirable to adapt reserve battery principles to the high energy batteries now available. The most advanced high energy density systems are based on certain couples, of which the following are presently best known: lithium/copper fluoride, lithium/vanadium oxide; lithium/carbon fluoride system, with single or multiple fluoride complex; lithium/silver chromate; and lithium/sulphur dioxide complex.

The various lithium systems show different open circuit voltages from 2.4 volts to 3.5 volts.

The low temperature performance of the batteries of these systems is substantially better than that of alkaline batteries. Energy densities in excess of 100 watt-hours per pound, and 6 to 10 watt hours per cubic inch, are realized from these batteries.

These high energy density primary batteries show good capacity retention for storage at room temperatures for 1 to 2 years. Except for lithium/sulphur dioxide system, some deterioration is shown in cell performance where the storage is extended at elevated temperatures of 55° and 72° C.

The degradation of the cell performance on storage is predominantly associated with the reactive lithium anode. The storage deficiencies of the high energy density systems are therefore obviated by the use of reserve type structures in which the electrolyte is kept isolated from the lithium anode, in a separate reservoir, during storage. In such an arrangement, a storage life of ten years or more would be expected.

The high rate capability of the lithium/sulphur dioxide system, both at elevated and at low temperatures, combined with the excellent high temperature storeability, provide all of these desirable features in the reserve type battery described below.

A further feature of a battery of this invention is that it has the unique property of being relatively insensitive to low concentrations of air or moisture in the environment and fabrication areas. As a consequence, the type of battery here disclosed has an intrinsic lower cost than other types of lithium batteries.

The lithium/sulphur dioxide cell contains a lithium anode, a carbon cathode, and an organic electrolyte consisting of liquid sulphur dioxide, lithium bromide, and a mixture of acetonitrile and propylene carbonate. The liquid sulphur dioxide is the depolarizer. The electrolyte contains approximately 70 percent sulphur dioxide by weight, and the remaining 30 percent comprises the electrolyte salt lithium bromide and the organic solvents propylene carbonate and acetonitrile. In the present lithium/sulphur dioxide batteries, copper is used as the lithium anode collector, which is electrically connected to the steel container can; aluminum is used for the sulphur dioxide cathode carbon collector, which is electrically connected to the aluminum cell top, and ethylene propylene rubber is used as an elastomeric seal structure.

The ethylene propylene rubber is stable in the electrolyte but it exhibits a finite rate of permeation of the sulphur dioxide vapor, which may cause corrosion of devices in the vicinity of the cell. The egress of $SO_2$ from the cell is reduced either by potting the cells in epoxy or by enclosing the battery in a hermetically sealed container with glass-to-metal hermetic electrical feedthroughs.

The cell construction as presently described in one application is made in a "D" cell size.

The electrodes of the cell are constructed by winding rectangular strips, of anode-separator-cathode-separator stacks, of appropriate width, into a cylindrical spiral roll, which is then placed in a nickel plated steel can. This method of construction is employed to give the cells a high rate capability by increasing the surface area of the electrodes. The anode terminal tab is electrically connected to the steel can, and the cathode terminal is electrically connected to the aluminum cell top which is electrically insulated from the cell can by a rubber grommet. The cell is sealed after the dry assembly by crimping the cell over the rubber grommet.

The cell is filled with the electrolyte through the rubber septum seal by means of a hypodermic needle.

Two modifications of the invention are illustrated herein.

One modification is based upon a group of cells each of which is provided with its own internal reservoir containing an electrolyte. A simple activating system is provided to simultaneously activate all the cells by opening the reservoir in each of the respective cells, to release the electrolyte and render each associated cell active.

In the second modification, a single common reservoir of electrolyte is provided, externally of the individual cells, and upon opening actuation of the normally closed closure for the electrolyte reservoir, the electrolyte is released and delivered through appropriately disposed conduits, to each of the individual cells, to activate those cells, so the entire battery is made immediately available for its intended use.

The two modifications of the invention are shown in the detailed arrangements in the drawings, in which.

Figure 3:
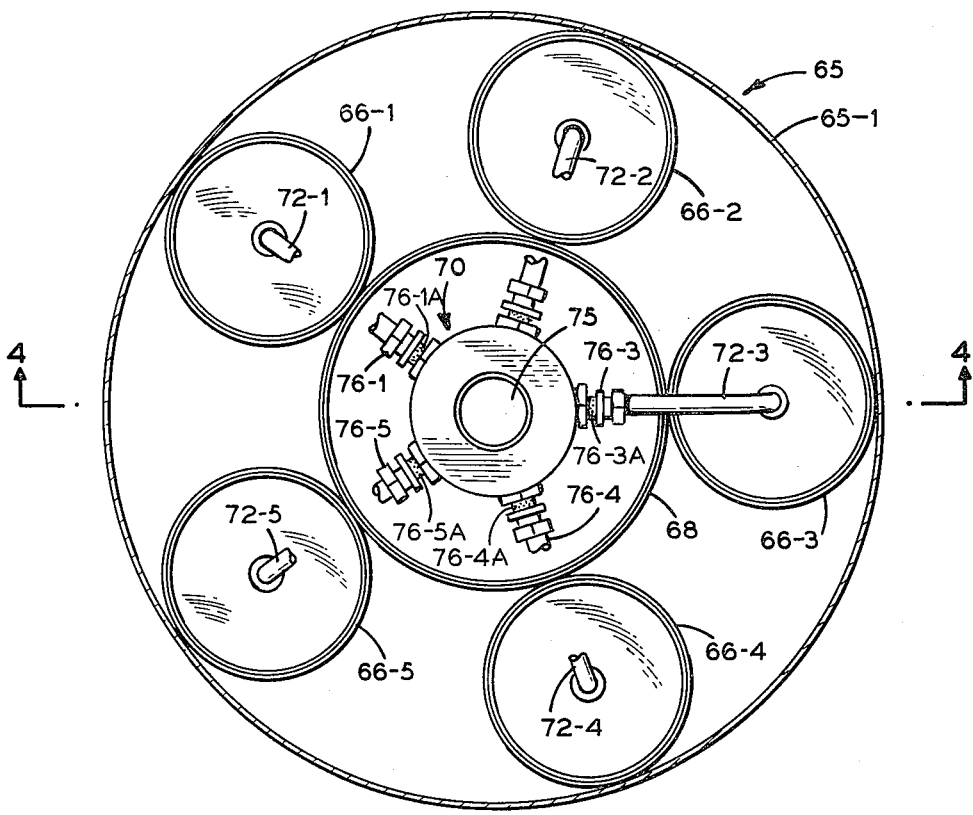
FIG. 3 is a plan view of a second modification of the invention, in which a common electrolyte reservoir is external to the individual cells, which are arranged in circular disposition around the central common electrolyte reservoir.
Figure 4:
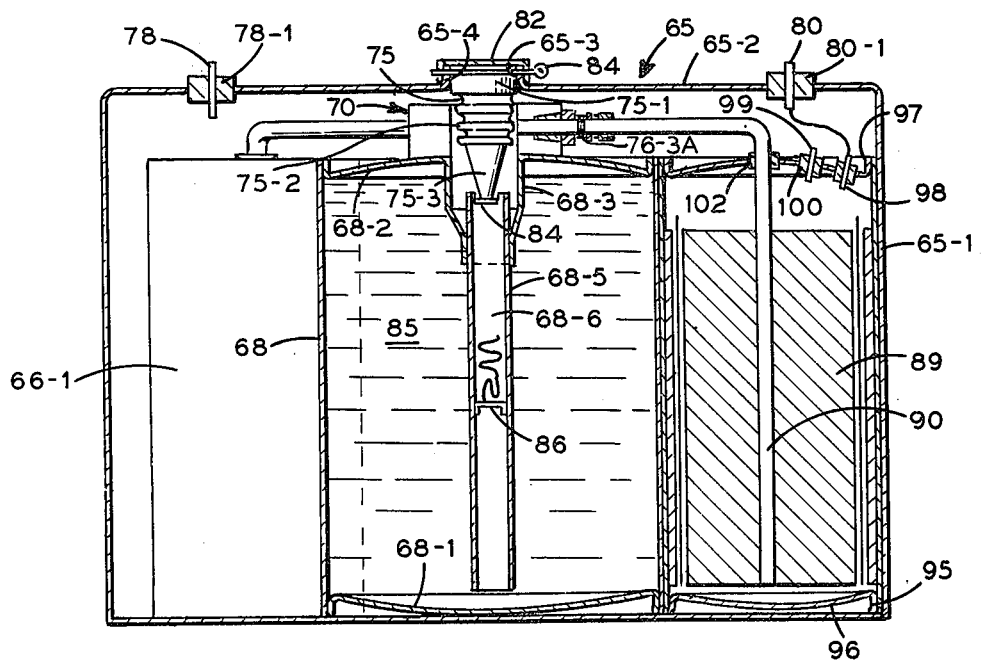

FIG. 4 is a vertical sectional view taken along the plane indicated by the line 4—4 in FIG. 3, and indicates schematically the internal construction of a cell and of the general arrangement and schematic construction of the electrolyte reservoir, and the construction by which, and the manner in which, the electrolyte is supplied to each of the cells, through an equalizing chamber that assures generally an equal supply of the electrolyte to each of the cells;

FIG. 5 is an enlarged schematic view of the cells in which the reservoir for the electrolyte is disposed as an internal container within the cell; and shows the manner in which the activator drive rod is normally held in detented position, and is withdrawn when the cell is to be activated, to permit a compressed pressure spring to actuate the drive rod when the spring is released to activate the cell.

The invention is generally directed to the construction of a reserve battery, consisting of a plurality of cells which are normally stored in dry non-activated condition, to prevent undesired chemical reactions between the elements of the cell while the cell is stored and before it is to be used to supply energy to an external load. When operation of the stored cell is desired, the electrolyte is released and permitted to enter the operative regions of each cell to initiate chemical action and to supply energy to an external circuit upon demand.

In one modification, a vial, or container, for the electrolyte is disposed within each cell, and the vial is normally sealed to isolate the electrolyte from the working components of the cell, so long as the cell is stored and its operation is not desired. When operation of the cell is desired, the vial or container of electrolyte is fractured, to release the electrolyte from the isolating vial into the operating compartment of the cell, between the respective electrodes, to thereby render the cell operative.

In a second modification, the reservoir for the electrolyte is isolated in its normally sealed container, outside of the several cells. When operation of the stored cells is desired, the seal of the reservoir is fractured to permit the electrolyte to be forced, by its own vapor pressure, and the pressure of an inert driver gas contained therein, to move out of the reservoir container into a common manifold, and from there into the respective cells to render them activated. An appropriate coupling box serves as a manifold between the reservoir and the several cells, and assures a balancing of pressures between the reservoir and the cells in order to assure the delivery of generally equal amounts of electrolyte to each of the several cells, for optimum operation of each cell.

Figure 1:
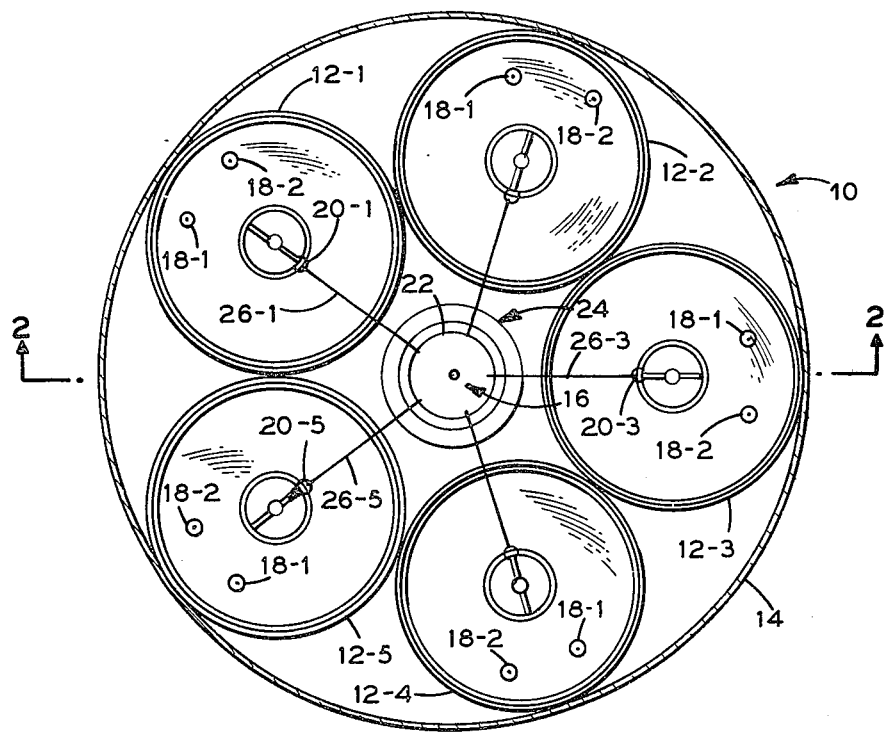
FIG. 1 is a plan view of a first modification of a battery showing five cells disposed in a circular disposition around the central axis of the battery, and all cells contained within a housing in which the individual cells may be potted to hold them in position against casual displacement; with each cell having its own reservoir for its electrolyte.

As shown in FIG. 1, a battery 10 consists of five cells 12-1 to 12-5, arranged in circular disposition, with an outer battery container 14 around a central axis 16.

Figure 2:
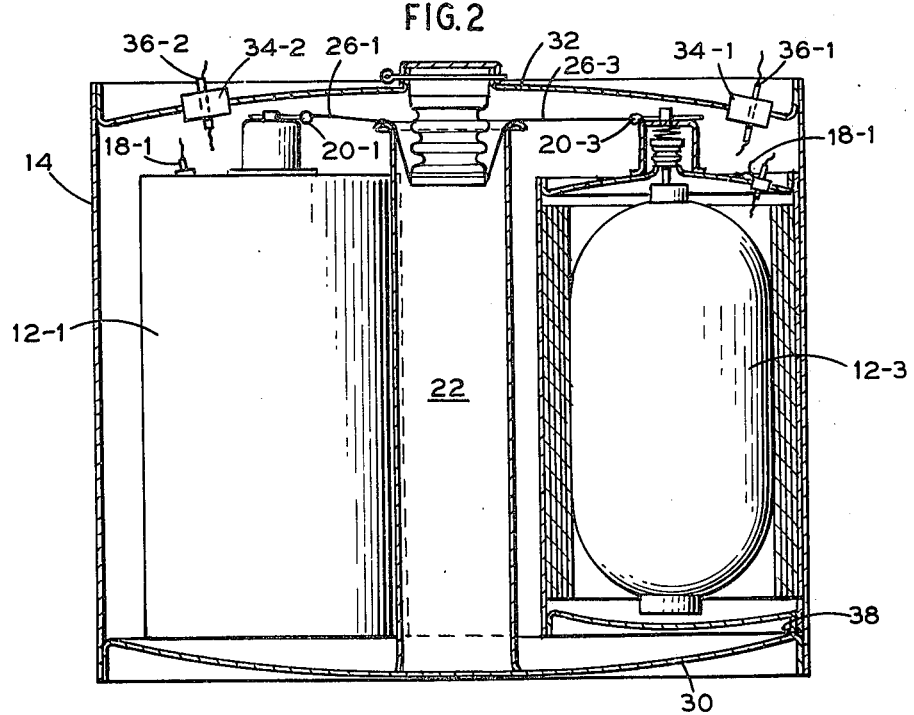
FIG. 2 is a sectional view through the battery of FIG. 1 taken along the vertical plane indicated by the line 2—2 in FIG. 1, and illustrates the general internal construction of one cell with an internal reservoir of electrolyte.

The five cells are normally kept in inactive condition, each cell being provided with a restraining pin 20-1, with a similar pin in each of the other cells through a series to 20-5. As will be shown in connection with the description in FIG. 2, the restraining pins, 20-1 to 20-5, are normally positioned in their detent positions, as shown in FIGS. 1 and 2, as long as the battery is not in active use and is waiting in storage until it is to be activated. In FIG. 2, the detent pins 20-1 and 20-3 are shown on cells 12-1 and 12-3.

The activating system is schematically indicated in the parts shown in FIG. 1, provided with a pressure pad 22 and reaction ring 24, which are appropriately operated, as shown later in FIG. 2, to develop pulling forces to pull radially on the detent pins 20-1 to 20-5, through corresponding connecting cables 26-1 through the series to 26-5, so all of the five detent pins 20-1 through 20-5 will be withdrawn from their detent positions, to release the operating mechanism associated with each cell. The cells will thereupon be activated and placed in condition to function as electrical sources of energy, ready to supply such energy through their terminals 18-1 and 18-2 to an external circuit, upon demand.

In order to retain the cells against casual displacement in response to any external forces, when the container shell 14 might be accidentally bumped or jarred, the cells within the container 14 are preferably potted. As may be seen in FIG. 1, there is considerable available empty space about the cells within the battery container 14, and in cases where the use of the cell is predetermined, and such use may include connection to other circuit elements, those other circuit elements may be disposed in the space within the container 14 to the extent that the various spaces are available and adequate for accommodation of those other elements.

The disposition of the cells within the battery container 14 may now be better understood upon reference to FIG. 2.

As shown in FIG. 2, the battery container is a round box structure 14, with a closing bottom 30 and a similar closing top 32 to provide an otherwise hermetically sealed box container for the cells.

Provision is made in the top cover 32 of the battery box 14 for certain elements, in a way that will maintain the hermetic seal unbroken. There are two glass beads 34-1 and 34-2 providing a metal-to-glass seal in the top metal cover 32, and those glass beads serve as supports for two metal feedthrough terminals 36-1 and 36-2, for connection to an external circuit. The connections from the terminals 36-1 and 36-2 to the internal cells 12-1 through 12-5 are not shown in FIG. 2, but their disposition will depend upon whether the cells are connected in series circuit connection, or in parallel circuit connection. Since the individual cells 12-1 through 12-5 will be contained in metallic cans, appropriate insulation between the cans and the battery container 14 may be provided by a suitable lining of insulating material 38 on the internal surface of the battery container 14, and between the cells.

The manner in which the withdrawal of the detent pins 20-1 through 20-5 permits the activation operation of each cell in the modification of FIGS. 1 and 2, is shown in more detail in FIG. 2 and in the enlarged view of FIG. 5.

As better shown in FIG. 5, the detent pin 20-1 is normally in its detent position, and extends through a hole 40-1 in the head 40-2 of an impact pin 40. The impact pin 40 comprises the head 40-2 and a coaxial reaction pressure flange 40-3 from which depends the impact shank 40-4. The detent pin 20 holds the impact pin 40 stationary, to compress a spring 41 against the reaction pressure flange 40-3 to store energy in the spring 41, until release. The flange 40-3 seats on the top of and is hermetically attached to a compressible bellows 42, and serves to close the bellows that serves to hermetically seal the cell casing 44, which contains the operating elements of the cell, including the anode, the cathode and the vial 46 for containing and isolating the electrolyte 47.

The vial 46 is made of a corrosion resistant material, such as a metal or a glass-lined metal or an equivalent and is constructed to have two frangible end pieces 48-1 and 48-2 that are seated in, and sealed to, two hollow tubular extensions 50-1 and 50-2, at the two ends of the vial 46. The upper frangible piece 48-1 is of cup shape, in order to receive and accommodate and guide the lower end 40-4 of the fracture pin 40. A rod 52 depends from the cup shaped fracturable element 48-1 and embodies an enlarged head 52-1 at the other end that normally rests on or near the equivalent bottom surface of the bottom fracturable element 48-2, in order that downward movement of the fracturing pin 40-4 will fracture and break the cup shaped sealing element 48-1, and strike the rod 52 to compel the enlarged head 52-1 on the rod to engage and break the cup shaped bottom sealing element 48-2.

In order to stabilize the rod 52 during the movement of the battery in handling and in order to control the transfer of the electrolyte, a hollow tube 56 is disposed in the vial 46 to concentrically surround the push rod 52, and is appropriately supported from the upper end of the vial, in the manner schematically illustrated at 56-1 at the top of the hollow tube 56, where it may be suitably joined to the inside of the vial 46.

In orer to actuate the push rod 52, when the detent pin 20-1 is removed from its detent position in the fracture pin 40, the compressed spring 41 is employed. Normally the spring 41, as a helical compression spring, is compressed to its maximum compressed condition between the flange 40-3 and the inside of a top wall of a tower cap 60 which is suitably anchored, preferably by welding, to the top cover 44-1 of the cell body 44, along an annular peripheral flange 60-1 that sits coaxially on the top cover 44-1.

When the detent pin 20-1 is withdrawn from the head 40-1 of the fracturing pin 40, the pin 40 is released to permitthe stored energy in the compressed spring 41 to force the pin 40 suddenly downward to cause the bottom end of the pin shank 40-4 to strike the sealing cup 48-1 of the vial 46 and simultaneously to act through the pressure rod 52 to press or strike the bottom sealing cup 48-2, to thereby fracture both cups 48-1 and 48-2.

The electrolyte 47 is thereupon expelled from the vial 46, under pressure of the driver gas and of the internal vapor pressure of the electrolyte within the vial 46, and the electrolyte is caused to move out into the operating space surrounding the vial 46 and into the spaces between the anode and cathode components that are wrapped around the vial.

The cell is thus activated, and is immediately ready to supply energy to an external circuit to which the cell is connected. For the purpose of connecting the cells of the battery in appropriate circuit arrangement, as previously selected, each cell is provided with two terminals, shown in FIG. 5 as terminals 64-1 and 64-2, which may preferably be fed through electrical conductors sealed in glass-to-metal beads 66 anchored in the the top cover 44-1 of each cell casing 44.

The second modification of the battery is schematically shown in FIGS. 3 and 4.

In the plan view of FIG. 3, a battery 65 is shown, in a box 65-1, with top cover removed and comprising five cells 66-1 and 66-5, each of which contains the usual anode and cathode components in dry state, with the electrolyte for the cells stored in a separate enclosing container or tank 68.

Referring now to FIGS. 3 and 4, the electrolyte tank 68 is shown with a top manifold box 70 having tubular conduits 72-1 through 72-5 connected between the manifold box 70 and each of the respective cells 66-1 through 66-5. Coaxially and centrally disposed within the manifold box 70 is a fracturing device 75 which becomes accessible for manual operation to render the battery activated, when such operation is desired. The general arrangement for that operation is shown in more detail in FIG. 4. Continuing with FIG. 3, the conduit to each of the cells is arranged to be connected through a sealed coupling 76-1 through 76-5 from the manifold box 70 to the respective cells, 66-1 through 66-5, including an insulating coupling 76-1A to 76-5A, to insulate the cells from each other to permit series connections.

More details are shown in FIG. 4, which shows a vertical elevation through the cell along the line 4-4 of FIG. 3, and which shows the inner construction of the electrolyte tank 68 and the general internal construction of one of the cells 66-1 through 66-5.

As shown in FIG. 4, the battery box 65-1 has a top cover 65-2 on which are mounted two battery terminals 78 and 80 consisting of electrical conductors sealed in glass beads 78-1 and 80-1, respectively, that are, in turn, sealed into the cover 65-2 to establish a hermetic seal anchorage in that cover.

The cover 65-2 is provided with a central access hole 65-3 that is circled with a vertical rim flange 65-4 on which is seated a cover cap 82, that is arranged to be held in place against casual separation by a frictionally held locking pin 84 that extends diametrically through the depending apron on the cap 82 and through the vertical upstanding rim flange 65-4.

When the battery is to be activated, the cap 82 is removed to permit access to the activating device 75 coaxially aligned with the opening 65-3.

As shown in FIG. 4, the tank 68 for the electrolyte has a regular bottom closure 68-1 and a top closure 68-2, which latter is formed with a coaxial cylindrical depending gripping and supporting cyliner 68-3 to support a central coaxial exit tube 68-5, that is supported to extend down almost to the bottom cover 68-1, to provide several functions in the operational control of the electrolyte tank 68.

The central control tube 68-5 is closed at its top end with a small circular frangible disc 84, that is normally closed and that serves to seal the top end of the control tube 68-5.

As one of the features of this invention the frangible disc 84 is made of a metal that will withstand the corrosive effect of the electrolyte, and is made sufficiently thin to enable it to be fractured with a minimum of applied pressure force. In order to impede the return of electrolyte to the reservoir after activation, a trap 86 is disposed in control tube 68-5, in some position intermediate the ends of that control tube, the tubular trap 86 being so shaped as always to contain some electrolyte regardless of the orientation of the battery.

The anode and cathode elements of a cell, for the purpose of the present description, consist of stacked coplanar sheets, appropriately, mechanically separated by separators, respectively, with the anode and cathode stacked material 89 wrapped spirally around a central axial supporting tube 90, extending substantially the full length of the cell, and serving initially as a physical support for the anode and cathode wrappings, and serving later as a filling conduit for transmitting the electrolyte into the cell for activating the cell and rendering it operative, when the predetermined activating operation is established to release the electrolyte to the individual cells.

The container can 95 for each cell consists of a metal cylinder with a simple bottom metal closure 96 and a top closure 97 that are hermetically sealed to the container can 95, through a suitable metal glass bonding structure, that will assure a long time hermetic seal. Top closure 97 serves as an insulating support for two terminals 98 and 99, that may be connected in appropriate desired circuit relationship with the other batteries, for parallel circuit or series circuit connections. The two terminals 98 and 99 are preferably supported in glass seals 100 supported on and hermetically sealed through the top closure 97. the terminals 98 and 99 are sealed as through-terminals in the glass seals, to retain the hermetic seal of the cell. In similar fashion, the axial filling tube 90 is supported in a glass seal 102 in order to insulate the filling tube 90 from the metallic top closure 97.

When the battery of FIGS. 3 and 4 is to be activated, the pin 84 is removed and the cover cap 82 is removed for access to the fracturing device 75. The fracturing device 75 embodies a hollow head ring 75-1 communicating with a hollow bellows 75-2 having a bottom closure impact piece 75-3. The fracturing device 75 is thus a hollow expansible and contractible device hermetically sealed below the hollow head ring 75-1.

The head ring 75-1 is seam soldered around its periphery to the vertical flange 65-4, to establish a hermetic seal. A suitable thin shank tool, such as a screwdriver, pressed down through the inside of the fracturing device 75 serves to press the impact piece 75-3 against the frangible disc 84 to fracture that disc 84, to start the activation process.

The fracture of disc 84 relieves pressure in the space 68-6, which permits the electrolyte to move up into and through control tube 68-5, and into the box 70, from which the electrolyte is then fed into the several conduits to the cells. Within a few seconds the cells are all activated to produce energy for the external circuit.

The mechanical details may be varied to achieve the results sought here, without departing from the spirit and scope of the invention as defined in the claims.

What is claimed is:

1. A reserve battery comprising
 1. an anode,
 2. a cathode,
 3. a separator between said anode and said cathode, with space between and around said anode and cathode to accomodate an electrolyte; and
 4. a closed case for said cell;
 a container external to said cell case for holding a quantity of electrolyte for said cell;
 a conduit system providing a passage between said electrolyte container and said cell case;
 a conduit system includes a first conduit extending through a wall of said electrolyte container, said first conduit being open at its inner end to communicate with the electrolyte in said container, and said first conduit being closed at its outer end outside of said container by a frangible closure;
 and said conduit system also includes a second conduit which extends into said cell through a wall of said cell case and has its outer end outside of said cell case;
 and a closed box enclosing said outer closed end of said electrolyte container conduit;
 said box having one wall constructed as a collapsible bellows;
 and activating means including a puncturing element supported on said bellows and aimed at said frangible closure, and said puncturing element being movable inwardly through operation of said bellows, to puncture said frangible closure; and said box having a second wall supporting a hollow coupling for coupling onto the outer end of said second conduit leading to said cell case; whereby, upon a fracturing puncture of said frangible closure, the electrolyte, under its vapor pressure and the added pressure of an inert driving gas, in its container, will be pushed through said conduit system into said cell case.

2. A reserve battery, as in claim 1, in which
 a single electrolyte container holds enough electrolyte to serve a plurality of cells;
 a plurality of cells are disposed adjacent to said electrolyte container;
 said closed box is disposed and supported to communicate with said closed end of said container conduit, whereby fracture of said frangible closure by said puncturing element will permit electrolyte to flow into said box;
 a plurality of hollow couplings are provided on said box for coupling to the respective conduits leading to the respective cell cases;
 and said puncturing element is supported and hermetically sealed on said box to be operable to puncture said frangible closure on said electrolyte conduit without affecting the hermetic seal of said box, whereby the released electrolyte may flow into the several cells to render them activated.

3. A reserve battery, as in claim 2, in which
 a housing encloses said electrolyte container and the plurality of cells, and said housing has a top cover with a central opening to provide access to said activating means;
 and a cover for said activating device to prevent casual undesired application of an activating force to said activating means.

* * * * *